United States Patent [19]

Harmon et al.

[11] Patent Number: 4,543,261

[45] Date of Patent: Sep. 24, 1985

[54] SEPARATING WHEY COMPONENTS INTO HIGH PURITY PRODUCTS BY ION EXCHANGE

[75] Inventors: Zita T. K. Harmon; Frederick J. Dechow, both of Midland, Mich.

[73] Assignee: The Dow Chemical Company, Midland, Mich.

[21] Appl. No.: 585,700

[22] Filed: Mar. 2, 1984

[51] Int. Cl.$^4$ .................. A23C 9/146; C12H 1/04
[52] U.S. Cl. .................. 426/271; 426/491; 426/583; 210/669; 210/685; 210/692
[58] Field of Search .......... 426/271, 491, 583; 210/669, 672, 677, 681, 685, 692, 656

[56] References Cited

U.S. PATENT DOCUMENTS 3,969,337  7/1976  Lauer et al. .................. 210/656

FOREIGN PATENT DOCUMENTS 2142812   2/1973   France .................. 426/271
2452881  12/1980   France .................. 426/271
7411060   2/1976   Netherlands .......... 426/271

*Primary Examiner*—Raymond Jones
*Assistant Examiner*—Marianne M. Cintins

[57] ABSTRACT

Salts and low molecular weight organic compounds are more efficiently separated from aqueous liquids by passing the liquid downwardly through a gel-type strong acid cation exchange resin, and eluting the resin. In a preferred embodiment, animal wastes and/or cheese whey are separated into usable components by removing insoluble organic material, then removing soluble proteins and/or enzymes by ion exchange with a macroporous weak base anion exchange resin, and then separating salts and nonionic organic compounds as above.

7 Claims, No Drawings

SEPARATING WHEY COMPONENTS INTO HIGH PURITY PRODUCTS BY ION EXCHANGE

BACKGROUND OF THE INVENTION

The present invention relates to a process for the separation of components of aqueous liquids containing salts and nonionic, organic compounds. In particular, the invention is a process for separating the components of animal fluids to recover high purity products.

Often, the production of animal products, such as meats, cheeses and the like, have associated therewith significant amounts of waste streams. For example, a major by-product in the cheese industry is whey. Blood and other protein-containing waste streams are often by-products of other animal processing industries. It has been found that such waste streams, in particular milk whey, possess significant quantities of useful proteins, natural sugars, salts and other useful materials. In fact, the protein found in such waste streams is often of very high quality.

Unfortunately, such useful products are often discarded rather than recovered. However, due to increasing concern about the disposal of such waste streams, and the development of end uses for the proteins and other materials found therein, there has recently developed a greater interest in recovering the components of those animal waste streams.

Ion exchange techniques have been employed to recover desirable proteins from animal waste streams. For example, in British Pat. Nos. 1,387,265; 1,436,547 and 1,585,111 is described the use of certain cellulosic ion exchangers to remove proteins from whey, blood, and the like. Unfortunately, the physical form of these cellulosic materials is not suitable for efficient ion exchange operation. Such cellulosic exchanges are generally fibrous particulates which tend to become matted together during the operation of an ion exchange process, thereby plugging the column and greatly reducing the operating rates thereof. It has been proposed to employ the cellulosic exchanger in an agitated vessel to avoid this problem. However, this is not a wholly satisfactory solution to the problem because it would be more desirable to operate the ion exchange process in a conventional column operation. It has also been proposed to deposit the cellulosic exchanger on an inert, spheroidal support. However, this requires the use of a great volume of inert material in the ion exchange column, thereby increasing the size and cost of the necessary equipment.

U.S. Pat. Nos. 4,100,149 and 4,229,342 describe the use of porous silica coated with crosslinked ion exchange polymers to remove proteins from aqueous solutions. Unfortunately, such supported exchanges are quite expensive compared to conventional synthetic ion exchange resins.

The use of conventional vinyl aromatic ion exchange resins, e.g., functionalized styrene/divinylbenzene resins, to remove proteins from aqueous liquids have been said to be disadvantageous due to the excess of swelling of the resins, the tendency of the resins to foul, the tendency for proteins to become irreversibly attached thereto and an overall failure to perform adequately. Accordingly, such poly(vinyl aromatic) exchangers have not heretofore been proposed for use in separating compounds of animal waste streams U.S. Pat. No. 3,969,538 describes the use of gel-type polystyrene sulfonate ion exchange resins to separate low molecular weight organic compounds from salts and organic molecules such as enzymes and proteins. While this process does provide a method for obtaining small organic compounds which are somewhat free from enzymes and salts, the separation is not as clean as desired and significant amounts of said enzymes and salts are found in the recovered low molecular weight organic compounds. In addition, this process does not provide a comprehensive process for separating all the material from animal or food waste streams into separate highly purified components.

Accordingly, it would be desirable to provide a process whereby the variable components of animal fluid waste streams are recovered in high purity preferably using inexpensive, commercially available ion exchange materials.

SUMMARY OF THE INVENTION

In one aspect, this is a process for separating soluble salts from nonionic low molecular weight organic compounds (hereinafter nonionic organic compound) which salts and nonionic low organic compounds are contained in aqueous fluids. This process comprises passing said aqueous fluid through a bed of a gel-type strongly acidic cation exchange resin, which cation exchange resin is in the form of spheroidal beads having a particle size distribution such that at least 80 volume percent of said beads have a particle size from about 0.9 to about 1.1 times the volume average particle size of said beads, then recovering a fraction of said aqueous fluid containing a major portion of said salts separate from a fraction of said liquid containing a major portion of said nonionic organic compound.

In a preferred embodiment, this invention is a process for separating the components from aqueous liquid containing suspended insoluble organic material, soluble proteins and enzymes, salts and nonionic organic compounds. This process comprises the steps of (a) removing insoluble organic materials from said liquid without removing the soluble proteins, enzymes, salts and nonionic organic compounds therefrom, then (b) passing the thus clarified liquid through a bed of a macroporous weak base anion exchange resin under conditions such that a major portion of said soluble proteins and enzymes are removed therefrom, then (c) passing said liquid through a bed of a gel-type strongly acidic cation exchange resin which resin is in the form of spheroidal beads having a particle size distribution such that at least 80 volume percent of said beads have a particle diameter of between 0.9 and 1.1 times the volume average particle diameter of said beads and then (d) recovering a fraction of said liquid containing a major portion of said salt separate from a fraction of said liquid containing a major portion of said nonionic organic compound.

DETAILED DESCRIPTION OF THE INVENTION

In its broadest aspect, this invention is a process for separating the components of an aqueous fluid containing soluble salts and nonionic organic compounds. The salts in said aqueous fluid are watersoluble and may be inorganic salts, such as sodium chloride, potassium chloride, sodium hydroxide and the like or organic salts such as sodium acetate, alkali metal lactates and the like.

The nonionic organic compound can be of biological origin, such as diverse sugars, especially lactose, sucrose, maltose, fructose or glucose, or can be another other water-soluble organic compound. By "nonionic" is meant that the compound contains no active acidic or basic groups having a pKa or pKb of less than about 7. By "low molecular weight" is meant that the compound has a molecular weight sufficiently low that the passage of such nonionic organic compound through the resin bed is retarded as compared with the passage of salts therethrough. The molecular weight is generally less than about 2,000, preferably less than 1,000, more preferably less than about 500, most preferably less than about 350.

The aqueous fluid containing said salts and nonionic organic compounds is preferably of animal origin and is more preferably milk whey which has been previously treated to remove insoluble organic materials, soluble proteins and enzymes. Suitable methods for removal of insoluble organic materials, proteins and enzymes are described hereinafter. Other animal fluids containing salts and low molecular weight nonionic organic compounds, such as blood, are also suitably employed herein.

The salts and nonionic organic compounds which remain after the soluble proteins and enzymes are removed are separated according to this invention by passing the aqueous fluid through a bed of a strongly acidic cation exchange resin having a narrow particle size distribution as described hereinafter. As said fluid is passed through the resin bed, the passage of the nonionic organic compound therethrough is retarded relative to the passage of the salts. Thus, the effluent from said resin bed will comprise a first fraction which is rich in salts and the fraction which is rich in said nonionic organic compound.

The ion exchange resin employed herein is a synthetic polymeric ion exchange resin containing a plurality of active strongly acidic ion exchange sites. Preferably the ion exchange sites are sulfonate groups. Preferably the resin is a styrene/divinylbenzene or a styrene/divinylbenzene/acrylic ester resin. The resin is in the form of spheroidal beads. Said spheroidal beads have a particle size distribution such that at least 80 volume percent of said beads have a particle diameter which is between 0.9 and 1.1 times the volume average particle diameter of said beads. Preferably, at least 90 volume percent of said beads have a particle diameter between 0.9 and 1.1 times the volume average particle diameter of said beads. In addition, the resin employed herein is a so-called gel-type or microporous resin. Most preferably the ion exchange resin is a microporous polystyrene resin which is crosslinked from about 1 to about 8 percent of divinylbenzene and which has an ion exchange capacity at least 4.0, preferably at least 5.0, milliequivalents per gram. When a strongly acidic cation exchange resin having the aforementioned particle size distribution is employed, exceptionally clean separation of the salt and the nonionic organic compound is achieved.

Advantageously, the counterion on the resin is the same as the cation of the salt to be separated in order to prevent an ion exchange reaction between the resin and the salt. For example, when milk whey is being treated, the resin is most advantageously converted into a suitable form before commencing the operation by treatment with milk whey.

Typically, the aforementioned separation is accomplished by contacting the resin bed with an amount of the aqueous liquid to be treated and then eluting the column with water. The eluate is recovered as a series of fractions which contain various proportions of salts and nonionic organic compounds. Generally, earlier appearing fractions are rich in salt, while later appearing fractions are rich in the nonionic organic compound.

In general, the aqueous liquid being treated is added to the resin bed in increments having a volume from about 1 to about 50, preferably about 5 to 40, more preferably about 10 to 30, percent of the volume of the resin bed. Alternatively, the aqueous fluid being treated may be added to the resin bed continuously at a flow rate that at any given time the resin bed contains an amount of the aqueous liquid within the aforementioned volume ranges. The amount of eluent water used depends on a variety of parameters including desired flow rates in the column, the amount of separation of salts and nonionic compounds desired and the shape and length of the resin bed.

Typically, eluent fractions containing mixtures of salt and nonionic organic compound are recycled back through the column to further separate the components. Said eluent fractions may be recovered from the bottom of the resin bed or recovered from various levels of the resin bed during operation of the column. Such recycling of mixed eluent fractions dramatically increases the efficiency of the separation.

Typically, the separation is conducted at a temperature from about 0° to about 60° C., or higher. However, if the nonionic organic compound is particularly volatile or reactive, somewhat cooler temperatures may be required. Preferably, the separation is conducted at a temperature between 20° and 60° C.

Using the aforementioned process, the nonionic organic compound may be obtained with generally greater than 90, preferably greater than 95, more preferably greater than 99, percent purity after dewatering. When the aqueous liquid being treated is cheese whey or blood or other animal fluid, the nonionic organic compound is typically a sugar, such as lactose, which may be used as human or animal food. The salts may be retained and employed for diverse purposes or may be discarded as desired.

In a preferred embodiment of this invention, an aqueous fluid containing soluble salt, a nonionic organic compound, protein and/or enzymes, and insoluble organic materials are processed to separate and recover the salts, low molecular organic compounds, proteins and enzymes, and insoluble materials.

In such preferred embodiment, the aqueous fluid is first treated to remove the insoluble organic material therefrom. Any suitable technique, such as filtration or centrifugation, may be employed to remove the insoluble materials as long as said process does not adversely affect the quality of the protein, enzymes or other recoverable components of said aqueous fluid.

Preferably, the insoluble materials are recovered from the aqueous fluid by an ultrafiltration process wherein the aqueous fluid is passed through an ultrafiltration membrane containing pores having a volume average diameter of about 0.1 to about 1, preferably 0.25 to 0.75, microns. In this manner, said insoluble organic materials are readily removed from said aqueous fluid while permitting the soluble components to pass through. Said insoluble materials may be subsequently recovered and are typically useful as animal foods and the like. Preferably, essentially all of said insoluble organic materials are removed from the aqueous fluid in this first step.

The thus-clarified fluid is then passed downwardly through a bed of synthetic macroporous weakly basic anion exchange resin to remove proteins and enzymes therefrom. The ion exchange resin employed herein is advantageously a crosslinked polymeric resin having pores with an average diameter of about 500° to about 20,000 Å, preferably, about 2,500° to 10,000 Å. Preferably, the ion exchange resin comprises crosslinked polymers of a vinylaromatic monomer, although small amounts of other monomers such as acrylic esters or methacrylic esters or other monomers copolymerizable with vinylaromatic monomers may be employed. Preferably, the polymers are crosslinked with about 4 to about 20, more preferably about 5 to about 10, weight percent of a crosslinking agent which is preferably divinybenzene. The resin further contains a plurality of weakly basic functionalities which are capable of exchanging anions. Typically, the weakly basic functionality is a primary, secondary or tertiary amine. Most generally, the weakly basic functionality is a dimethylamino group.

Such macroporous resins are conventionally prepared by copolymerizing a mixture of the desired monomers in the presence of an inert diluent which is soluble in the monomer but insoluble in the polymers prepared therefrom. To obtain macroporous resins having the desired pore size, said diluent should comprise from about 30 to about 70, more preferably from about 40 to about 70, weight percent of diluent, said weight percent being expressed as a percentage of the combined weight of diluent and monomers employed in preparing said resin.

Methods for preparing macroporous resins can be found, for example, in U.S. Pat. Nos. 3,549,562 and 3,637,535.

Advantageously, the resin is "preconditioned" prior to use in order to fully expand the pores in said resin beads. Said preconditioning is advantageously performed by contacting the resin with alternating portions of dilute acid and base solutions separated by washings with water.

Typically, proteins and enzymes are removed by passing the aqueous fluid downwardly through the macroporous resin bed at a flow rate such that the protein and enzymes are retained on the resin while substantially all of the remaining components of the fluid pass through. Typically, a flow rate of said liquid through the resin of about 0.1 to about 5, more preferably from about 0.2 to about 1.5, bed volumes per hour is adequate. This step of the process may be conducted at any convenient temperature, but temperatures between 0° and 50° C. are preferred. The amount of fluid which may be treated depends on the concentrations of proteins and enzymes therein. Typically, the aqueous fluid can be contacted with the resin until significant quantities of proteins and enzymes begin to pass through said column, i.e., until the resin bed is exhausted. Typically, exhaustion of the resin occurs at between about 10 and about 50 bed volumes.

Upon exhaustion of the resin bed, the retained proteins and enzymes can be recovered by eluting the resin with the dilute acid solution. Preferably, the acid employed is 0.01–1.5N, preferably 0.05–0.5N hydrochloric acid. Following elution of the resin, a high purity protein solution is obtained. This protein solution may be dried, if desired, and used as additives in diverse human and animal foods. Following elution of the resin, the resin may be returned to use to treat additional quantities of said aqueous fluids.

Following treatment of the aqueous fluid to remove proteins, the remaining nonionic organic compounds and salts are then separated from the remaining aqueous fluid according to the aforedescribed contact with a gel-type, strongly acidic cation exchange resin. In this manner, separate fractions of insoluble organic materials, proteins and enzymes, salt and low molecular weight nonionic compounds are obtained each in high purity.

The following examples are provided to illustrate the invention but not to limit the scope thereof. All parts and percentages are by weight unless otherwise indicated.

EXAMPLE 1

Approximately 5 gallons of cheese whey is processed through a Millipore Pellicon Cassette system multi-filtration unit equipped with an absolute 0.5 micron cassette filter. The process conducted at a pump rate of 2,400 milliliters per minute and a filtrate rate of 100 to 200 milliliters per minute. The material retained in the filter is recycled back through the filter until 760 milliliters of filtrate is collected, leaving 200 milliliters of retained material or concentrate. The filtrate is very clear and free of virtually all insoluble material. The filtrate further contains approximately 94 percent of the total solids of the original cheese whey sample, as well as about 93 percent of the protein and 98 percent of the ash.

EXAMPLE 2

Using the process described in Example 1, insoluble material is removed from sufficient cheese whey to yield up to 375 milliliters of filtrate. This filtered cheese whey is then passed through a 0.5 inch diameter column containing 25 milliliters of a weak basic macroporous styrene/divinylbenzene anion exchange resin having pores with an average diameter of 5000 Å. This resin has been preconditioned by successive washings with a 5 percent HCl solution, deionized water, a 4 percent sodium hydroxide solution and deionized water. The effluent from the resin bed is collected in 10 milliliter test tubes and analyzed for protein content using the Sigma Chemical Company No. 690 Protein Test Kit (a modified biuret colorimetric test). The results are as reported in Table I following. For comparison, the preceding procedure is repeated except that the macroporous resin is not preconditioned prior to use. These results are recorded as Sample No. C-1 in Table I following.

TABLE I

| | % Protein Adsorption[2] | |
|---|---|---|
| Bed Volumes[1] | Sample No. 1 | Sample No. C-1* |
| 1 | 96 | 88 |
| 3 | 91 | 85 |
| 4 | — | 50 |
| 5 | 90 | 0 |
| 6 | 81 | 70 |
| 7 | 75 | 61 |
| 9 | 76 | — |
| 10 | — | 53 |
| 11 | 82 | — |
| 12 | 78 | — |
| 13 | 77 | — |

TABLE I-continued

| Bed Volumes[1] | % Protein Adsorption[2] | |
|---|---|---|
| | Sample No. 1 | Sample No. C-1* |
| 14 | 72 | — |

*Not an example of the invention.
[1]Bed volumes of filter cheese whey flowed through the resin bed.
[2]Weight percent of the protein in the sample removed by the resin.

As can be seen from the data in Table I, the preconditioned resin absorbs significantly greater amounts of protein than the nonconditioned resin. In addition, more bed volumes throughput can be employed with the preconditioned resin than the nonconditioned resin.

EXAMPLE 3

Into a 1.02 inch diameter, 6 foot tall glass column are placed 500 milliliters of a strong acid cation exchange resin (gel-type) in the calcium form. The resin beads have a particle size distribution such that 95 volume percent of the beads are retained on 45 and 50 mesh screens. The height of the resin bed is 3.0 foot. After the resin is loaded into the column, it is backwashed with water and allowed to settle and a liquid level in the column is drained to just below the top of the resin bed. Then, 25 milliliters of the feed solution containing 3.03 weight percent lactose and 0.7 percent calcium chloride is added to the bed and allowed to drip slowly through until it is also drained just below the resin bed level. The column is then eluted with water at a rate such that the flow rate of the outlet from the bed is maintained at 3.5 to 4.0 milliliters per minute. The effluent is collected in 30-milliliter test tubes and analyzed for lactose via a concentrated sulfuric acid phenol colorimetric test. The collected samples are also analyzed for chloride content via a chloride titration. The results are as reported in Table II following.

TABLE II

| Tube No. | Gram Cl[-1] | Gram Lactose[2] |
|---|---|---|
| 1 | 0 | 0 |
| 2 | 0 | 0 |
| 3 | 0 | 0 |
| 4 | 0 | 0 |
| 5 | 0 | 0 |
| 6 | 0.00247 | 0 |
| 7 | 0.00123 | 0.0012 |
| 8 | 0.02005 | 0.0725 |
| 9 | 0.06066 | 0.1450 |
| 10 | 0.02159 | 0.1624 |
| 11 | 0 | 0.1137 |
| 12 | 0 | 0.0754 |
| 13 | 0 | 0.0464 |
| 14 | 0 | 0.0290 |
| 15 | 0 | 0.0145 |
| 16 | 0 | 0.0075 |
| 17 | 0 | 0.0049 |
| 18 | 0 | 0.0030 |
| 19* | 0 | 0.0011 |
| 20 | 0 | 0.0009 |
| 21 | 0 | 0.0005 |
| 22 | 0 | 0.0003 |
| 23 | 0 | 0.0003 |

*Some sample is lost between Test Numbers 18 and 19.
[1]Weight of chloride ion as determined by titration, in sample collected in the stated tube. Total chloride collected is 82 percent of the total added to the solution.
[2]Weight of lactose as determined by sulfonic acid/phenol colorimetry in the stated tube. About 90 percent of lactose added to the resin bed is recovered.

As can be seen from Table II, the salts as indicated by chloride in the analysis breaks through the resin bed earlier than the majority of the lactose. The chloride also comes through much more sharply, i.e., in a smaller volume of eluent than does the lactose. Thus, it is seen that clean separations between the salts and the lactose is achieved with the method of this invention.

What is claimed is:

1. A process for separating the components of an aqueous fluid containing suspended insoluble organic material, soluble proteins, enzymes, salts and low molecular weight nonionic organic compounds, said process comprising the steps of
   (a) removing the insoluble organic material from said fluid without removing the soluble proteins, enzymes, salts or nonionic organic compounds therefrom, then
   (b) passing the fluid through a bed of a macroporous weakly basic anion exchange resin under conditions such that at least a major portion of said soluble proteins and enzymes are removed therefrom, then
   (c) passing said liquid through a bed of a gel-type strongly acidic cation exchange resin which resin is in the form of spheroidal beads having a particle size distribution such that at least 80 volume percent of said beads have a particle diameter from about 0.9 to about 1.1 times the volume average particle diameter of said beads, and then
   (d) recovering a fraction of the eluate containing a major portion of said salt separate from that fraction of the major portion of said nonionic organic compound which eluant has passed through the bed of said gel-type cation exchange resin.

2. The process of claim 1 wherein the insoluble organic material is removed by ultrafiltration.

3. The process of claim 1 wherein the macroporous anion exchange resin is a crosslinked polymer of a vinylaromatic monomer to which weakly basic ion exchange sites are attached.

4. The process of claim 1 wherein a fraction of the eluate from the cation exchange resin contains both salts and nonionic organic compound and said fraction containing salt and nonionic organic compound is recycled through the cation exchange resin.

5. The process of claim 1 wherein said cation exchange resin is a sulfonated crosslinked polymer of a vinylaromatic monomer.

6. The process of claim 1 wherein the aqueous fluid is of animal origin.

7. The process of claim 6 wherein the aqueous fluid is milk whey.

* * * * *

UNITED STATES PATENT AND TRADEMARK OFFICE
CERTIFICATE OF CORRECTION

PATENT NO. : 4,543,261

DATED : September 24, 1985

INVENTOR(S) : Zita T. K. Harmon et al.

It is certified that error appears in the above-identified patent and that said Letters Patent is hereby corrected as shown below:

Col. 7, Example 2, Line 11, "absorbs" should read --adsorbs--.

Signed and Sealed this

Fourteenth Day of October, 1986

[SEAL]

Attest:

DONALD J. QUIGG

Attesting Officer

Commissioner of Patents and Trademarks